(12) United States Patent
Sailer et al.

(10) Patent No.: US 7,392,819 B2
(45) Date of Patent: Jul. 1, 2008

(54) METHOD OF SETTING THE BALL TRAVEL OF A VALVE-LASH-ADJUSTING ELEMENT

(75) Inventors: Peter Sailer, Erlangen (DE); Oliver Schnell, Veitsbronn (DE)

(73) Assignee: INA Schaeffler KG, Herzogenaurach (DE)

( * ) Notice: Subject to any disclaimer, the term of this patent is extended or adjusted under 35 U.S.C. 154(b) by 501 days.

(21) Appl. No.: 11/102,010

(22) Filed: Apr. 8, 2005

(65) Prior Publication Data

US 2005/0229980 A1  Oct. 20, 2005

(51) Int. Cl.
*F16K 15/04* (2006.01)

(52) U.S. Cl. .............................. 137/15.19; 137/315.33; 137/539; 123/90.57

(58) Field of Classification Search .................. 137/539, 137/539.5, 15.17, 15.18, 15.19, 315.33; 123/90.53, 123/90.55, 90.56, 90.57, 90.58, 90.59
See application file for complete search history.

(56) References Cited

U.S. PATENT DOCUMENTS

| | | | | | |
|---|---|---|---|---|---|
| 2,797,673 | A | * | 7/1957 | Black ...................... | 123/90.55 |
| 2,922,432 | A | * | 1/1960 | Huntington et al. ......... | 137/539 |
| 3,502,058 | A | * | 3/1970 | Thompson ................ | 123/90.34 |
| 3,605,707 | A | * | 9/1971 | Line ......................... | 123/90.57 |
| 3,875,908 | A | * | 4/1975 | Ayres ....................... | 123/90.34 |
| 4,227,495 | A | * | 10/1980 | Krieg ....................... | 123/90.55 |
| 4,457,270 | A | * | 7/1984 | Kodama et al. ........... | 123/90.55 |
| 4,807,576 | A | * | 2/1989 | Sonoda et al. ............ | 123/90.57 |
| 4,917,059 | A | * | 4/1990 | Umeda ..................... | 123/90.55 |
| 5,725,013 | A | * | 3/1998 | Premiski et al. ............. | 137/539 |
| 5,931,132 | A | * | 8/1999 | Freeland ................... | 123/90.55 |
| 5,967,105 | A | * | 10/1999 | Freeland ................... | 123/90.57 |
| 6,006,710 | A | * | 12/1999 | Stephan .................... | 123/90.57 |

* cited by examiner

*Primary Examiner*—John Rivell
(74) *Attorney, Agent, or Firm*—Charles A. Muserlian

(57) ABSTRACT

The invention relates to a method of setting the ball travel of a valve-closing body, designed as valve ball, of a control valve of a hydraulic valve-lash-adjusting element which has a plunger with a plunger head and a central bore, a valve seat being provided at the outer end of this central bore, this valve seat being controlled by a valve ball, the ball travel of which is limited by a valve cap which has a cap flange and a cap base, the cap flange resting with its bearing surface on a base of a recess of the plunger head, and a stop of the cap base serving as a travel limit for the valve ball.

2 Claims, 3 Drawing Sheets

/ 1

METHOD OF SETTING THE BALL TRAVEL OF A VALVE-LASH-ADJUSTING ELEMENT

FIELD OF THE INVENTION

The invention relates to a method of setting the ball travel of a valve-closing body, designed as valve ball, of a control valve of a hydraulic valve-lash-adjusting element which has a plunger with a plunger head and a central bore in the same, a valve seat being provided at the outer end of this central bore, this valve seat being controlled by a valve ball, the ball travel of which is limited by a valve can which has a cap flange and a cap base, the cap flange resting with its bearing surface on a base of a recess of the plunger head, and a stop of the cap base serving as a travel limit for the valve ball.

BACKGROUND OF THE INVENTION

Known valve-lash-adjusting elements, which may be designed as a standard, free-ball or reverse-spring version, have, inter alia, a plunger, with a plunger head which has a central bore, on the outer end of which the valve seat of a control valve is provided, this valve seat being controlled by a valve ball, the ball travel of which is limited by a valve cap which has a cap flange and a cap base, the cap flange resting with its bearing surface on a recess of the plunger head, and the inside of the valve ball serving as a stop surface.

Such valve-lash-adjusting elements have the disadvantage that, due to process-related production tolerances which cannot be narrowed further, considerable spread of the ball travel occurs and, as a consequence thereof, corresponding pre-travel losses of the valve-lash-adjusting elements occur. These have a varying effect depending on the tolerance zone position of the ball travel during cold starting or in the high-temperature phase of the internal combustion engine. During the cold starting, average to large ball travel is desired, and small to average ball travel is desired in the high-temperature phase. Accordingly, closely toleranced, average ball travel is the ideal compromise.

OBJECT OF THE INVENTION

The object of the invention is therefore to specify a method with which, in a hydraulic valve-lash-adjusting element, closely toleranced ball travel can be set using existing components with little outlay in terms of construction.

DESCRIPTION OF THE INVENTION

The method of the invention for setting the ball travel of a valve-closing body, designed as valve ball, of a control valve of a hydraulic valve-lash-adjusting element which has a plunger with a plunger head and a central bore in the same, a valve seat being provided at the outer end of this central bore, this valve seat being controlled by a valve ball, the ball travel of which is limited by a valve cap which has a cap flange and a cap base, the cap flange resting with its bearing surface on a base of a recess of the plunger head, and a stop of the cap base serving as a travel limit for the valve ball, comprises measuring an internal depth dimension (a) of the valve cap, extending this internal depth dimension (a) from the bearing surface of the cap flange up to the stop of the cap base, and lying a projecting dimension (b) of a measuring ball, in the valve seat, relative to the base of the recess has been measured, determinating a calculated value of the ball travel (c=a–c), and selective, a matched valve ball having the ball diameter required for the desired ball travel from a number of valve balls of different, known diameter and fitting the same together with the measured plunger and the measured valve cap.

The measuring of the projecting dimension of the measuring ball records the tolerances of the recess and of the valve seat, whereas the internal depth dimension takes into account the tolerances of the valve cap, before these components are joined together. The two measured values enable calculated ball travel to be determined, the deviation of which from the desired ball travel produces the required diameter of the valve ball to be fitted. In this way, the components to be matched are determined before their assembly. Subsequent inspection of the ball travel in the assembled state is thus unnecessary.

An alternative method of setting the desired value of the ball travel of the valve ball of a control valve of a valve-lash-adjusting element consists in the fact that the actual value of the ball travel of a control valve fitted together with any desired valve ball and any desired valve cap is measured and is set to its desired value by subsequently pressing the valve cap.

The advantage of this solution over the first solution consists in the fact that it is not necessary to keep measured valve balls in stock and that the sequence of the measuring turns out to be simpler overall.

BRIEF DESCRIPTION OF THE DRAWINGS

Further features of the invention follow from the description below and the drawings, in which an exemplary embodiment of the invention is schematically shown.

In the drawings.

DETAILED DESCRIPTION OF THE DRAWINGS

Figure 1:
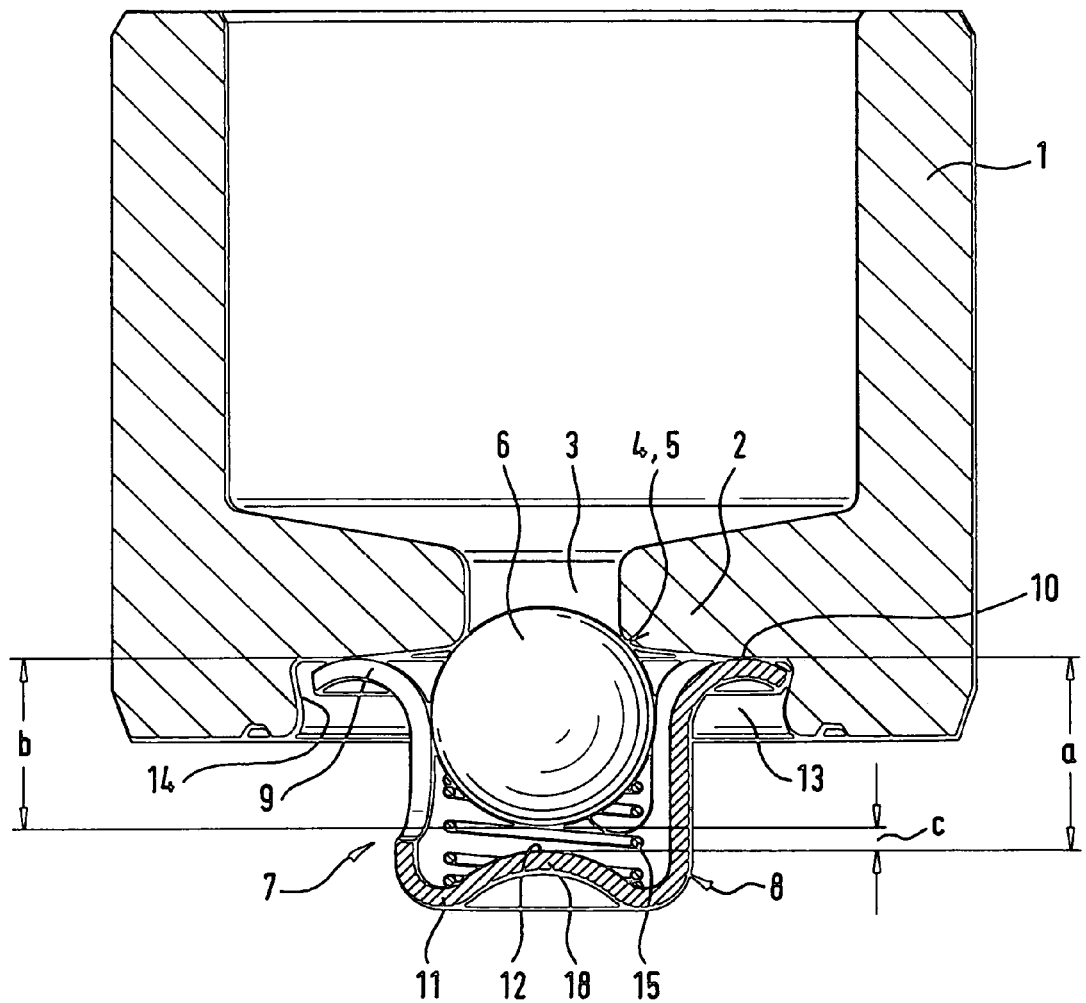
FIG. 1 shows a longitudinal section through a standard version of a hydraulic valve-lash-adjusting element, having a plunger on whose plunger head a control valve is arranged, and having a depth dimension of a valve cap, a projecting dimension of a measuring ball, and ball travel of the same calculated therefrom.

FIG. 1 shows a longitudinal section through a hydraulic valve-lash-adjusting element in standard design, having a plunger 1 which has a plunger head 2 with a central bore 3. The latter, at its outer end 4, has a valve seat 5, which is controlled by a valve ball 6 of a control valve 7.

The control valve 7 has a valve cap 8, which has a cap flange 9 with a bearing surface 10 and a cap base 11 with a subsequent-pressing hollow 18, the inner surface of which serves as a stop 12 for the valve ball 6. The bearing surface 10 rests in a recess 13 of the plunger head 2 on a base 17 designated in FIG. 3 and is centered at the edge 14 of this recess 13. Since the edge 14 of the recess 13 is drawn in slightly and the valve cap 8 is designed to be spring-mounted, the latter is clipped in position in the recess 13 during assembly.

The stop 12 serves as a travel limit for the valve ball 6 and as a guide and support for a ball spring 15. The latter, in the standard version of the control valve 7 present here, loads the valve ball 6 in the direction of the valve seat 5.

The outside of the stop 12 is designed as a subsequent-pressing hollow 18, the function of which will be described below with reference to FIG. 4.

An internal depth dimension a between the bearing surface 10 and the stop 12 of the valve cap 8 and a projecting dimension b of the measuring ball 16 relative to the base 17 of the recess 13 result in calculated ball travel c as the difference between a and b.

Figure 2:
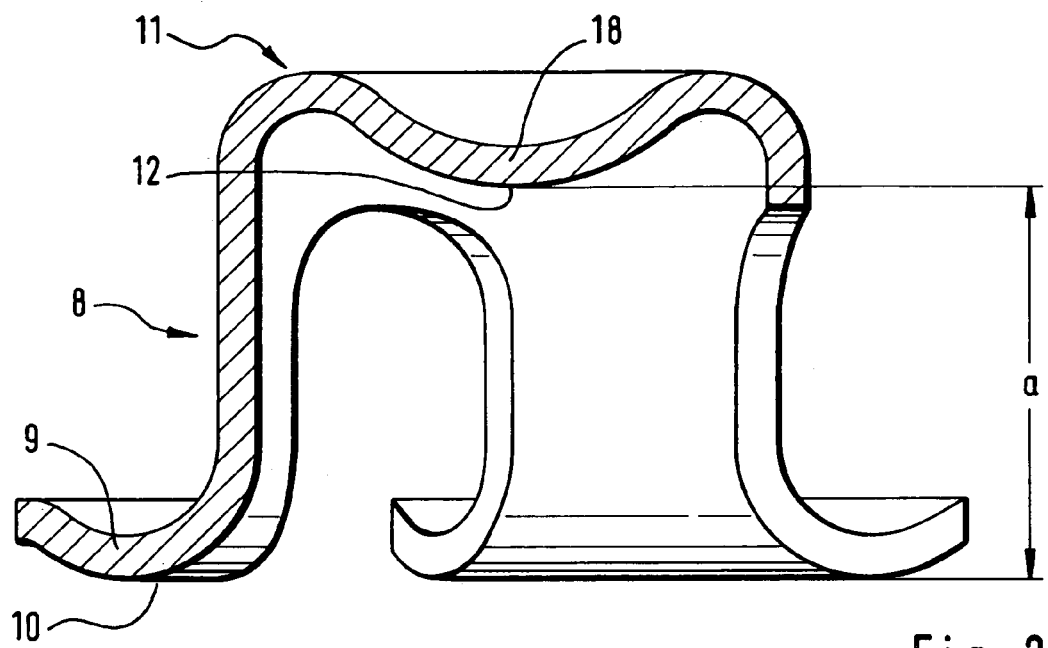
FIG. 2 shows a longitudinal section through a measured valve cap with its internal depth dimension.

Shown in FIG. 2 is an enlarged longitudinal section of the valve cap 8, with the cap flange 9 and its bearing surface 10 and with the cap base 11 and its stop 12. The internal depth dimension a is established by the distance between the bearing surface 10 and the stop 12 of the valve cap 8.

Figure 3:
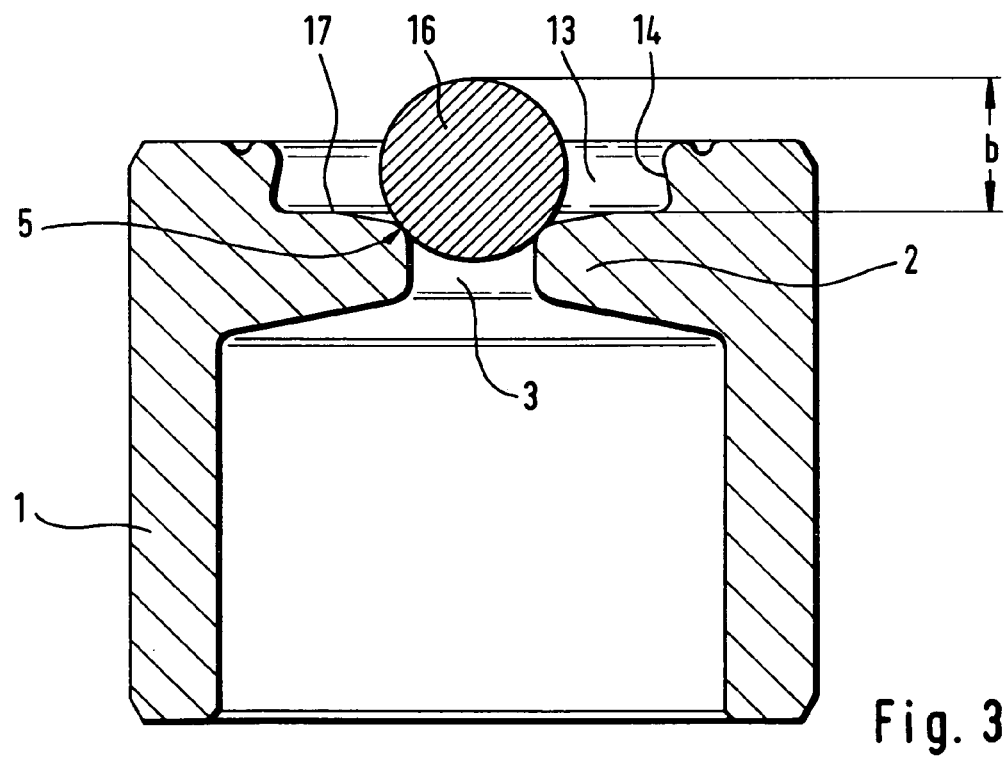
FIG. 3 shows the plunger with plunger head according to FIG. 1, but with a measuring ball arranged in a valve seat in measuring position and with its projecting dimension.

FIG. 3 shows the plunger 1 with the plunger head 2, which has the central bore 3 with the valve seat 5, in which the measuring ball 16 lies. In addition, the recess 13 with its edge 14 and its base 17 are shown, the latter being the reference surface for the projecting dimension b of the measuring ball 16.

The method according to the invention, according to method claim 1, functions as follows:

First of all the internal depth dimension a of any desired valve cap 8 and the projecting dimension b of a measuring ball 16 in any desired plunger 1 are measured. The difference between the measured valves a–b results in the calculated ball travel c. As a rule, the latter will deviate from the desired ball travel. The difference between the calculated ball travel c and the desired ball travel determines the deviation of the diameter of the valve ball 6 to be matched from the diameter of the measuring ball 16 in order to achieve the desired travel of the valve ball 6.

Figure 4:
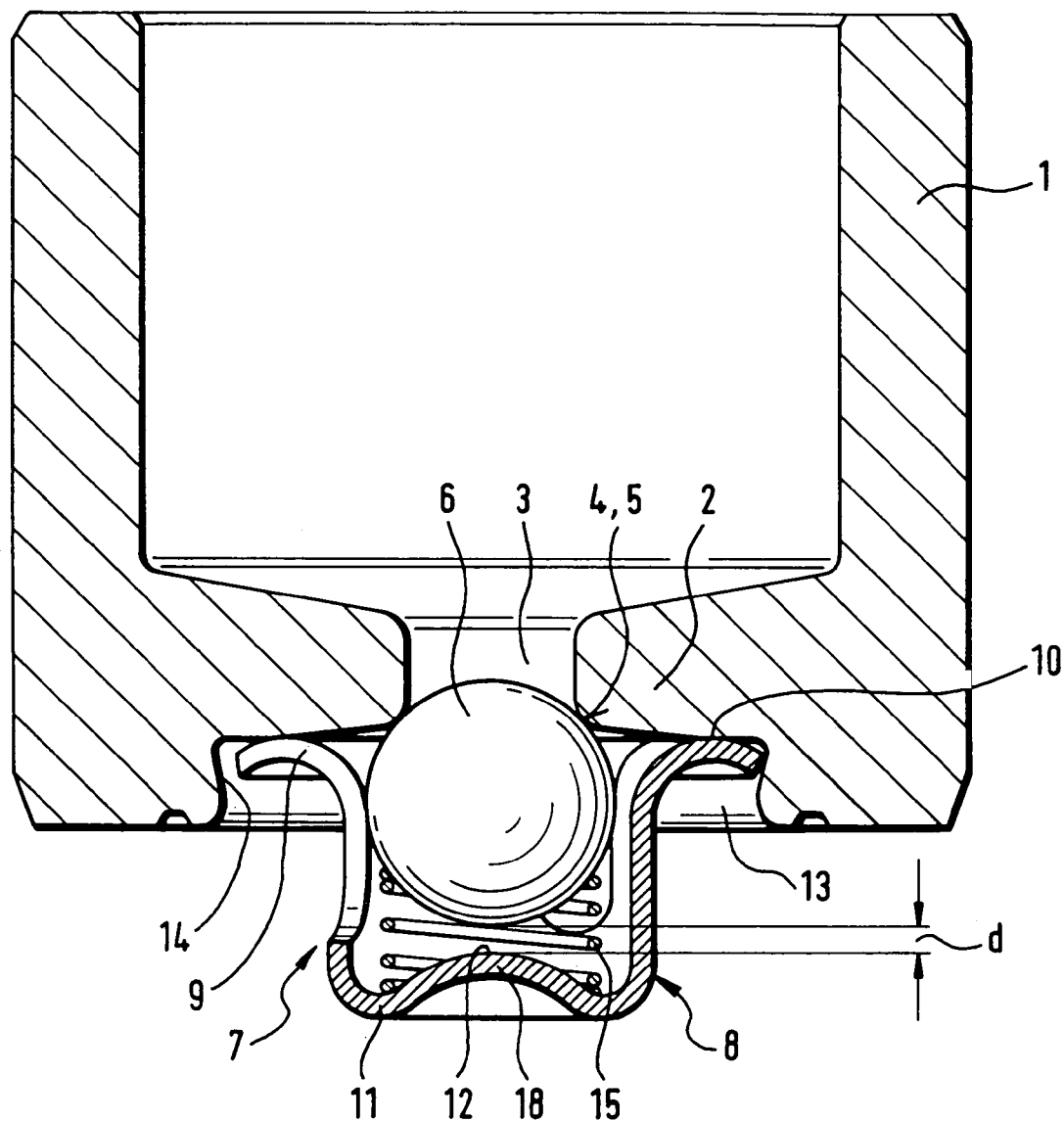
FIG. 4 shows a longitudinal section as in FIG. 1, but with measured ball travel of any desired valve ball.

A longitudinal section through a standard version of a hydraulic valve-lash-adjusting element according to FIG. 1 is shown in FIG. 4. Since the reference numerals of FIGS. 4 and 1 correspond, reference is made to the description of FIG. 1. However, the valve ball 6 is any desired valve ball and the ball travel d is a measured or corrected ball travel.

The desired travel of the valve ball 6 is achieved by subsequently pressing the valve cap 8, the material of which permits permanent deformation. A suitable tool for the subsequent pressing is applied in the subsequent-pressing hollow 18. The actual travel of the valve ball 6 is measured or checked before and after the deformation of the valve cap 8.

The invention claimed is:

1. A method of setting the ball travel of a valve-closing body, designed as valve ball, of a control valve of a hydraulic valve-lash-adjusting element which has a plunger with a plunger head and a central bore in the same, a valve seat being provided at the outer end of this central bore, this valve seat being controlled by a valve ball, the ball travel of which is limited by a valve cap which has a cap flange and a cap base, the cap flange resting with its bearing surface on a base of a recess of the plunger head, and a stop of the cap base serving as a travel limit for the valve ball, comprising measuring an internal depth dimension (a) of the valve cap, extending this internal depth dimension (a) from the bearing surface of the cap flange up to the stop of the cap base, and lying a projecting dimension (b) of a measuring ball, in the valve seat, relative to the base of the recess has been measured, determining a calculated value of the ball travel (c=a–c), and selective, a matched valve ball having the ball diameter required for the desired ball travel from a number of valve balls of different, known diameter and fitting the same together with the measured plunger and the measured valve cap.

2. A method of setting the bail travel of a valve-closing body, designed as valve ball of a control valve of a hydraulic valve-lash-adjusting element which has a plunger with a plunger head and a central bore in the same, a valve seat being provided at the outer end of this central bore, this valve seat being controlled by a valve ball, the ball travel of which is limited by a valve cap which has a cap flange and a cap base, the cap flange resting with its bearing surface on a base of a recess of the plunger head, and a stop of the cap base serving as a travel limit for the valve ball comprising measuring the actual value of the ball travel of the control valve fitted together with any desired valve ball and any desired valve cap and then pressing the valve cap to set its desired value.

* * * * *